United States Patent
Chen et al.

(10) Patent No.: US 11,054,679 B2
(45) Date of Patent: Jul. 6, 2021

(54) DISPLAY APPARATUS AND CONTROL METHOD OF DISPLAY APPARATUS

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Gang Chen, Beijing (CN); Zhihui Wang, Beijing (CN); He Sun, Beijing (CN); Xiuzhu Tang, Beijing (CN); Guang Wang, Beijing (CN); Yanli Zhao, Beijing (CN); Xiaolong Liu, Beijing (CN); Shuo Yang, Beijing (CN); Di Wang, Beijing (CN); Yu Wang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 40 days.

(21) Appl. No.: 16/537,106

(22) Filed: Aug. 9, 2019

(65) Prior Publication Data
US 2020/0302887 A1 Sep. 24, 2020

(30) Foreign Application Priority Data
Mar. 19, 2019 (CN) .......................... 201910209158.2

(51) Int. Cl.
*G02F 1/13* (2006.01)
*G02F 1/1333* (2006.01)
(Continued)

(52) U.S. Cl.
CPC ........ *G02F 1/1323* (2013.01); *G02F 1/13624* (2013.01); *G02F 1/133305* (2013.01); *G09G 3/3659* (2013.01); *G09G 2320/028* (2013.01)

(58) Field of Classification Search
None
See application file for complete search history.

(56) References Cited

U.S. PATENT DOCUMENTS

| 9,110,339 B2 | 8/2015 | Huang et al. |
| 2012/0069256 A1* | 3/2012 | Huang .............. G02F 1/134309 349/33 |

(Continued)

FOREIGN PATENT DOCUMENTS

| CN | 106597714 A | 4/2017 |
| CN | 107918225 A | 4/2018 |

(Continued)

OTHER PUBLICATIONS

Li, Jun et al. Refractive Indices of Liquid Crystals for Display Applications (Year: 2005).*

(Continued)

*Primary Examiner* — Phu Vu
(74) *Attorney, Agent, or Firm* — Kinney & Lange, P.A.

(57) ABSTRACT

A display apparatus and a control method for controlling a display apparatus are provided. The display apparatus includes: a display panel including multiple rows of scan lines and multiple columns of data lines, the scan lines and the data lines defining multiple sub-pixel regions, a first view pixel and a second view pixel being provided in each sub-pixel region; and a view control device connected with display panel, the view control device configured to: identify the number of users on a user side of display panel; and control a driving voltage of the scan lines according to the number of the users, so that the display panel controls first view pixel and second view pixel according to driving (Continued)

voltage so as to display a first view mode or a second view mode. A visual angle in the first view mode is greater than a visual angle in the second view mode.

17 Claims, 6 Drawing Sheets

(51) Int. Cl.
*G09G 3/36* (2006.01)
*G02F 1/1362* (2006.01)

(56) References Cited

U.S. PATENT DOCUMENTS

| 2016/0226029 | A1* | 8/2016 | Lee | H01L 27/322 |
| 2018/0267370 | A1* | 9/2018 | Chu | G02F 1/134309 |
| 2019/0278117 | A1* | 9/2019 | Chung | G02F 1/1343 |

FOREIGN PATENT DOCUMENTS

| CN | 108519704 A | 9/2018 |
| JP | 0337623 A | 2/1991 |
| JP | 3231638 B2 | 11/2001 |
| KR | 20110078785 A | 7/2011 |
| TW | 201213990 A | 4/2012 |

OTHER PUBLICATIONS

First Chinese Office Action dated Apr. 16, 2021, received for corresponding Chinese Patent Application No. 201910209158.2, 13 pages.

* cited by examiner

DISPLAY APPARATUS AND CONTROL METHOD OF DISPLAY APPARATUS

CROSS-REFERENCE TO RELATED APPLICATION

This application claims the benefit of Chinese Patent Application No. 201910209158.2 filed on Mar. 19, 2019 in the National Intellectual Property Administration of China, the whole disclosure of which is incorporated herein by reference.

TECHNICAL FIELD

The present disclosure relates to the field of display technologies, and in particular, to a display apparatus and a control method of a display apparatus.

BACKGROUND

A liquid crystal display (abbreviated as LCD) has advantages such as good image quality, small size, light weight, low driving voltage, low power consumption, no radiation and relatively low manufacturing cost, so that it is dominant in the field of flat panel displays.

As people may use a display apparatus more and more in public, business secrets and personal privacy will inevitably be peeped, resulting in privacy leakage. Therefore, how to avoid information leakage so as to effectively protect business secrets and personal privacy has become a research focus in the display field. Through research, the inventors have found that the display apparatus in the related art cannot protect against peeping intelligently according to surrounding environments, so the user's needs cannot be met.

SUMMARY

In an aspect, a display apparatus is provided including: a display panel including a plurality of rows of scan lines and a plurality of columns of data lines, the plurality of rows of scan lines and the plurality of columns of data lines defining a plurality of sub-pixel regions, a first view pixel and a second view pixel being provided in each of the sub-pixel regions; and a view control device connected with the display panel, the view control device configured to: identify the number of users on a user side of the display panel; and control a driving voltage of the scan lines according to the number of the users, so that the display panel controls the first view pixel and the second view pixel according to the driving voltage so as to display a first view mode or a second view mode, wherein a visual angle in the first view mode is greater than a visual angle in the second view mode.

For example, the view control device is configured to control the driving voltage of the scan lines according to the number of the users, so that the display panel controls both the first view pixel and the second view pixel to emit light so as to display the first view mode.

For example, the view control device is configured to control the driving voltage of the scan lines according to the number of the users, so that the display panel controls the first view pixel not to emit light and the second view pixel to emit light so as to display the second view mode.

For example, a first switch unit and a second switch unit are further provided in each of the sub-pixel regions; and the first view pixel is respectively connected with one of the scan lines and one of the data lines through the first switch unit, the second view pixel is respectively connected with one of the scan lines and one of the data lines through the second switch unit, the first switch unit and the second switch unit in the same one of the sub-pixels regions are connected with the same one of the scan lines and the same one of the data lines.

For example, the first switch unit and the second switch unit are both thin film transistors; and a threshold voltage of the first switch unit is greater than a threshold voltage of the second switch unit, so that the display panel controls the first view pixel and the second view pixel according to a relationship between the driving voltage and the threshold voltage of the first switch unit and a relationship between the driving voltage and the threshold voltage of the second switch unit.

For example, the second view pixel includes: a liquid crystal layer; a color filter layer; and an optical film layer on a side of the color filter layer facing the liquid crystal layer, wherein a refractive index of the optical film layer is smaller than a refractive index of the liquid crystal layer.

For example, the first view pixel and the second view pixel each include a pixel electrode; and the pixel electrode of the first view pixel includes a first sub-electrode extending in a first direction and a second sub-electrode extending in a second direction, and the first direction intersects with the second direction to form a first angle; the pixel electrode of the second view pixel includes a third sub-electrode extending in a third direction and a fourth sub-electrode extending in a fourth direction, and the third direction intersects with the fourth direction to form a second angle, the first angle being not equal to the second angle.

For example, the first angle is greater than the second angle.

For example, an area of the first view pixel is greater than an area of the second view pixel.

For example, the view control device includes: an acquiring device configured to acquire image information on a user side of the display panel; a processor configured to identify the image information so as to obtain the number of users; and a controller connected with the processor, wherein the processor is further configured to: send a first control signal to the controller in response to that the number of users is equal to 1; and send a second control signal to the controller in response to that the number of users is greater than 1; and wherein the controller is configured to: control the driving voltage of the scan lines to be a first voltage according to the first control signal, so that the display panel displays the first view mode according to the first voltage; and control the driving voltage of the scan lines to be a second voltage according to the second control signal, so that the display panel displays the second view mode according to the second voltage.

For example, the view control device includes: an acquiring device configured to acquire image information on a user side of the display panel; and a processor configured to: identify the image information so as to obtain the number of users; in response to that the number of users is equal to 1, control the driving voltage of the scan lines to be a first voltage, so that the display panel displays the first view mode according to the first voltage; and in response to that the number of users is greater than 1, control the driving voltage of the scan lines to be a second voltage, so that the display panel displays the second view mode according to the second voltage.

For example, the first voltage is greater than the second voltage.

For example, the first voltage is equal to the threshold voltage of the first switch unit, and the second voltage is equal to the threshold voltage of the second switch unit.

For example, the controller is further configured to receive control instructions from the users so as to start to supply or stop supplying an electric power to the acquiring device and the processor according to the control instructions.

For example, the display apparatus further includes a backlight module; and the controller is further configured to adjust a brightness of the backlight module according to the first control signal or the second control signal.

For example, the controller is further configured to: according to the second control signal, generate alert information so as to alert the users.

In another aspect, a control method of a display apparatus is provided, the display apparatus including a display panel and a view control device, the display panel including a plurality of rows of scan lines and a plurality of columns of data lines, the plurality of rows of scan lines and the plurality of columns of data lines defining a plurality of sub-pixel regions, a first view pixel and a second view pixel being provided in each of the sub-pixel regions, wherein the control method includes: identifying the number of users on a user side of the display panel by using the view control device; and controlling a driving voltage of the scan lines according to the number of the users, so that the display panel controls the first view pixel and the second view pixel according to the driving voltage so as to display a first view mode or a second view mode, wherein a visual angle in the first view mode is greater than a visual angle in the second view mode.

BRIEF DESCRIPTION OF THE DRAWINGS

Accompanying drawings are used to provide a further understanding of technical solutions of the present disclosure, and constitute a part of the specification. The drawings, together with embodiments of the present application, are used to explain the technical solutions of the present disclosure, and should not be construed as limiting the technical solutions of the present disclosure.

DETAILED DESCRIPTION OF EMBODIMENTS

Embodiments of the present disclosure will be described in detail below with reference to the accompanying drawings in order to make objectives, technical solutions and advantages of the present disclosure more clear. It should be noted that features in various embodiments of the present disclosure may be arbitrarily combined with each other without conflict.

Steps illustrated in flowcharts of the drawings may be executed in a computer system in a way such as a set of computer executable instructions. Also, although logical sequences are shown in the flowcharts, in some cases the steps shown or described may be performed in different orders from that described herein.

Unless otherwise defined, technical terms or scientific terms used in the embodiments of the present disclosure should be understood in the ordinary meanings by those skilled in the art. Words such as "first", "second" and the like used in the embodiments of the present disclosure do not denote any order, quantity, or importance, but are merely used to distinguish different components. Words such as "comprising" or "comprises" and the like mean that an element or an item that precedes the words includes elements or items that are listed following the words and equivalents thereof, without excluding other elements or items. Words such as "connecting" or "connected" and the like are not limited to physical or mechanical connections, but may include electrical connections, whether direct or indirect. Expressions such as "signal connection" or "communication connection" and the like mean that signals may be transmitted between two or more connected components.

Herein, an expression "visual angle" means an angle range in which an image displayed by the display apparatus can be clearly observed. Generally, the visual angle may be defined according to contrast, grayscale inversion or chromatic aberration, for example, an angle range in which the contrast may be greater than or equal to 10 may be defined as the visual angle of the display apparatus.

Herein, an expression "user side of a display panel" and "user side of a display apparatus" means that a side of the display panel or the display apparatus facing the user(s).

Figure 1:
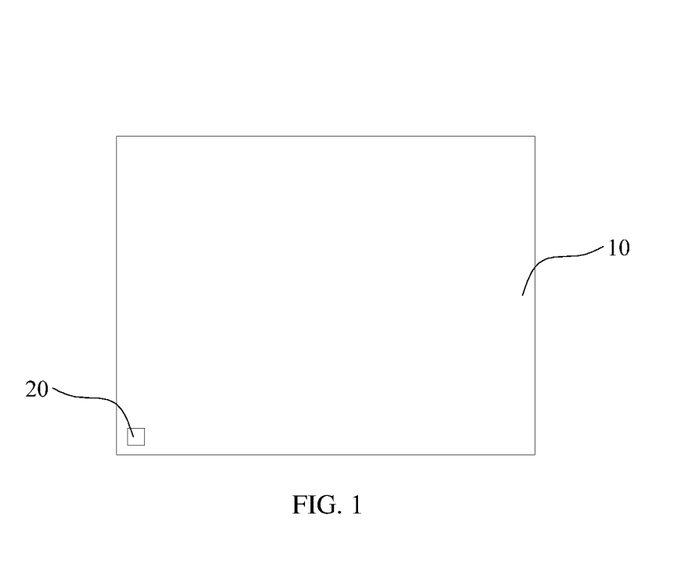
FIG. 1 is a schematic structural view of a display apparatus according to some embodiments of the present disclosure.

Some embodiments of the present disclosure provide a display apparatus. FIG. 1 is a schematic structural view of a display apparatus according to some embodiments of the present disclosure. As shown in FIG. 1, a display apparatus according to some embodiments of the present disclosure includes a display panel 10 and a view control device 20. The display panel 10 includes a first view mode and a second view mode. The view control device 20 is configured to: identify the number of users on a user side of the display panel, and control a driving voltage for the display panel according to the number of users, so that the display panel displays the first view mode or the second view mode according to the driving voltage.

A visual angle in the first view mode is greater than a visual angle in the second view mode. It should be noted that an anti-peeping effect may be realized to a certain extent since the visual angle in the second view mode is relatively small.

For example, the display panel 10 may be a liquid crystal display panel, which may have a twisted nematic (abbreviated as TN) mode, an in-plane switching (abbreviated as IPS) mode, or a fringe field switching (abbreviated as FFS) mode, and the embodiments of the present disclosure are not limited thereto.

Optionally, the view control device 20 may be disposed at any position of the display apparatus, which is not limited in the embodiments of the present disclosure.

The display apparatus according to the embodiments of the present disclosure includes a display panel and a view control device. The display panel includes a first view mode and a second view mode, wherein the visual angle in the first view mode is greater than the visual angle in the second view mode. The view control device is configured to identify the number of users on the user side of the display panel, and control the driving voltage for the display panel according to the number of users, so that the display panel displays the first view mode or the second view mode according to the driving voltage. By providing the view control device in the display apparatus according to the embodiments of the present disclosure, the view modes of the display panel may be intelligently switched according to surrounding environments, so that an intelligent anti-peeping effect may be realized, and the user's needs may be met.

Figure 2:
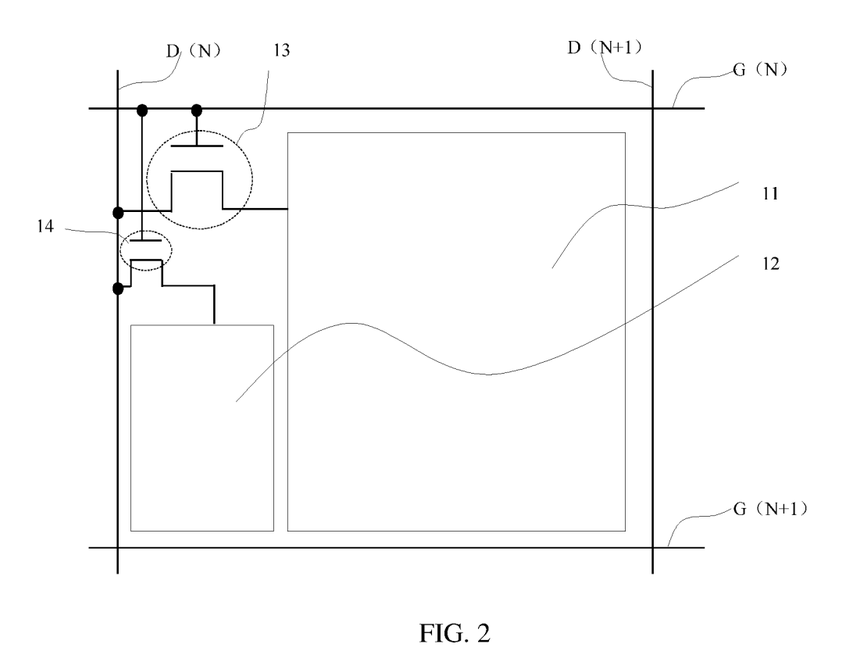
FIG. 2 is a schematic view of a sub-pixel region of a display panel according to some embodiments of the present disclosure.

Optionally, FIG. 2 is a schematic view of a sub-pixel region of a display panel according to some embodiments of the present disclosure. As shown in FIG. 2, the display panel according to the embodiments of the present disclosure includes: a plurality of rows of scan lines G and a plurality of columns of data lines D. The plurality of rows of scan lines G and the plurality of columns of data lines D define a plurality of sub-pixel regions, and each of the sub-pixel regions is provided with a first view pixel 11, a second view pixel 12, a first switch unit 13, and a second switch unit 14.

Specifically, the first view pixel 11 is connected to the scan line G and the data line D through the first switch unit 13, respectively; and the second view pixels 12 is connected to the scan line G, the data line D through the second switch unit 14, respectively. The first switch unit 13 and the second switch unit 14 in the same sub-pixel region are connected to the same scan line, and connected to the same data line.

For example, the first switch unit 13 is a thin film transistor. A control electrode of the thin film transistor 13 is connected to the scan line G, a first electrode thereof is connected to the data line D, and a second electrode thereof is connected to the first view pixel 11. The second switch unit 14 is a thin film transistor. A control electrode of the thin film transistor 14 is connected to the scan line G, a first electrode thereof is connected to the data line D, and a second electrode thereof is connected to the second view pixel 12. Specifically, a threshold voltage of the first switch unit 13 is greater than a threshold voltage of the second switch unit 14.

It should be noted that the first view pixel and the second view pixel in the same sub-pixel region have the same color.

Optionally, the first view pixel 11 and the second view pixel 12 are adjacent to each other in an up-down direction or in a left-right direction, that is, in a direction in which the scan line G extends or in a direction in which the data line D extends, which are not limited in the embodiments of the present disclosure. FIG. 2 illustrates an example in which the first view pixel 11 and the second view pixel 12 are adjacent to each other in the left-right direction.

It should be noted that FIG. 2 illustrates $N^{th}$ sub-pixel region in the display panel, $N^{th}$ scan line G(N) and $(N+1)^{th}$ scan line G(N+1), as well as $N^{th}$ data line D(N) and $(N+1)^{th}$ data line D(N+1). FIG. 2 only illustrates a relationship between the first view pixel, the second view pixel and surrounding wires, without limiting a relative area, shape and size thereof.

Optionally, the visual angle of the display panel is independent of an area of the first view pixel or an area of the second view pixel, that is, the area of the first view pixel may be greater than the area of the second view pixel, and may be equal to the area of the second view pixel, or even may be smaller than the area of the second view pixel, which is not limited in the embodiments of the present disclosure.

In some embodiments of the present disclosure, the area of the first view pixel may be set to be greater than the area of the second view pixel. Since the first view pixel has a large area ratio, a contrast between a display effect when the first view pixel emits light and a display effect when the first view pixel does not emit light is relatively obvious, so that the anti-peeping effect of the display apparatus may be further improved.

In the embodiments of the present disclosure, a threshold voltage (i.e., turn-on voltage) of the first switch unit 13 is a first voltage V1, and a threshold voltage (i.e., turn-on voltage) of the second switch unit 14 is a second voltage V2, and the first voltage V1 is greater than the second voltage V2. When a voltage of an input signal supplied by the scan line connected to the sub-pixel region is the first voltage, both the first switch unit and the second switch unit are turned on, so that both the first view pixel 11 and the second view pixel 12 emit light. When the voltage of the input signal supplied by the scan line connected to the sub-pixel region is the second voltage, the first switch unit is turned off and the second switch unit is turned on, so that the first view pixel 11 does not emit light and the second view pixel 12 emits light.

The threshold voltage of the first switch unit may be different from that of the second switch unit by setting a width and a length of a channel of the thin film transistor.

In addition, in the technical solution provided by the embodiments of the present disclosure, the number of sub-pixel regions is not reduced, and therefore the resolution of the display apparatus is not reduced.

In the embodiments, when both the first view pixel and the second view pixel emit light, the display panel displays the first view mode. In this mode, the visual angle of the display apparatus is large, so that a normal display effect may be achieved. When the first view pixel does not emit light and the second view pixel emits light, that is, when only the second view pixel emits light, the display panel displays the second view mode. In this mode, the visual angle of the display apparatus is small, so that the anti-peeping effect may be achieved.

In order to realize that the visual angle in the first view mode is greater than the visual angle in the second view mode, for example, the embodiments of the present disclosure may provide the following implementations.

Figure 3:
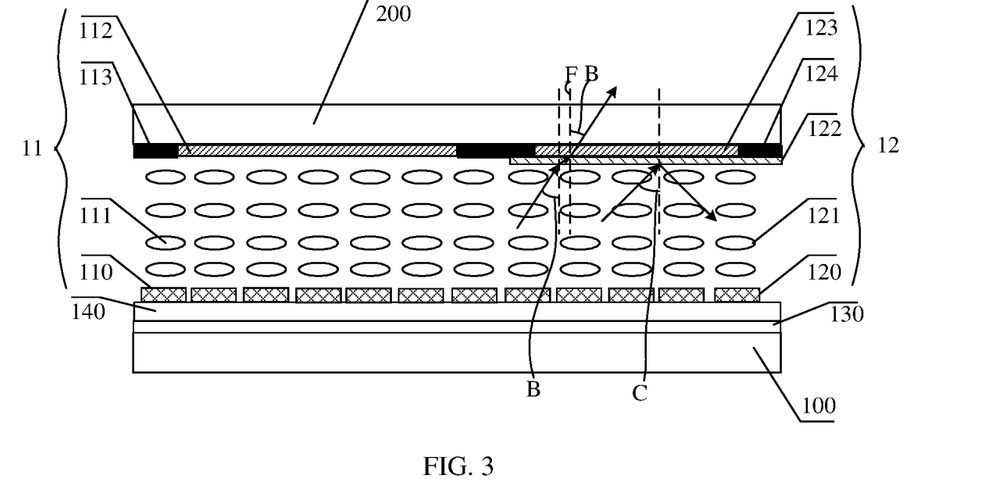
FIG. 3 is a schematic structural view of a sub-pixel region according to some embodiments of the present disclosure.

FIG. 3 is a schematic structural view of a sub-pixel region according to some embodiments of the present disclosure. As shown in FIG. 3, a display panel according to some embodiments of the present disclosure includes: a first substrate 100, a second substrate 200, and the first view pixel 11 and the second view pixel 12 which are both disposed between the first substrate 100 and the second substrate 200. For example, the first substrate 100 and structures disposed thereon constitute a TFT array substrate, and the second substrate 200 and structures disposed thereon constitute a color filter substrate. As shown in FIG. 3, a first electrode 130, second electrodes 110, 120, and an insulating layer 140 disposed between the first electrode 130 and the second electrodes 110, 120 may be disposed on the first substrate 100. For example, the first electrode 130 may be a common electrode and the second electrodes 110, 120 may be a pixel electrode.

The first view pixel 11 may include a first electrode 130, a second electrode 110, a liquid crystal layer 111, a color filter layer 112, and a black matrix layer 113. The second view pixel 12 may include a first electrode 130, a second electrode 120, a liquid crystal layer 121, an optical film layer 122, a color filter layer 123, and a black matrix layer 124. Optionally, the liquid crystal layer 111 of the first view pixel 11 and the liquid crystal layer 121 of the second view pixel 12 may be located in the same layer. The first electrode 130 of the first view pixel 11 and the first electrode 130 of the second view pixel 12 may be formed as a single plate electrode. The second electrode 110 of the first view pixel 11 and the second electrode 120 of the second view pixel 12 may be strip electrodes, respectively. With reference to FIG. 2 and FIG. 3, the second electrode 110 of the first view pixel 11 may be electrically connected to the first switch unit 13, and the second electrode 120 of the second view pixel 12 may be electrically connected to the second switch unit 14.

As shown in FIG. 3, in the second view pixel 12, the optical film layer 122 is disposed above the liquid crystal layer 121, that is, on a side of the color filter layer 123 and the black matrix layer 124 facing the liquid crystal layers 111, 121. A refractive index of the optical film layer 122 is smaller than a refractive index of the liquid crystal layer 121. The color filter layer 123 is disposed on a side of the optical film layer 122 facing away from the liquid crystal layer 121.

It should be noted that the color filter layer 112, the color filter layer 123, the black matrix layer 113, and the black matrix layer 124 are disposed in the same layer.

In some embodiments of the present disclosure, the optical film layer 122 may be composed of a material having a refractive index smaller than that of the liquid crystal layer 121. For example, the material of the optical film layer 122 may include an organic material. Herein, a material having a refractive index smaller than that of the liquid crystal layer 121 may be referred to as a "low refractive index material", and the optical film layer 122 may be referred to as a low refractive index layer. In the embodiment shown in FIG. 3, the optical film layer 122 covers at least the color filter layer 123, that is, an orthographic projection of the color filter layer 123 on the second substrate 200 falls into an orthographic projection of the optical film layer 122 on the second substrate 200.

For example, the optical film layer 122 is a planarization layer doped with a low refractive index material. By adjusting a material ratio of the planarization layer, the low refractive index material is doped into a material forming the planarization layer such that the refractive index of the planarization layer 122 doped with the low refractive index material is smaller than the refractive index of the liquid crystal layer 121.

Figure 4:
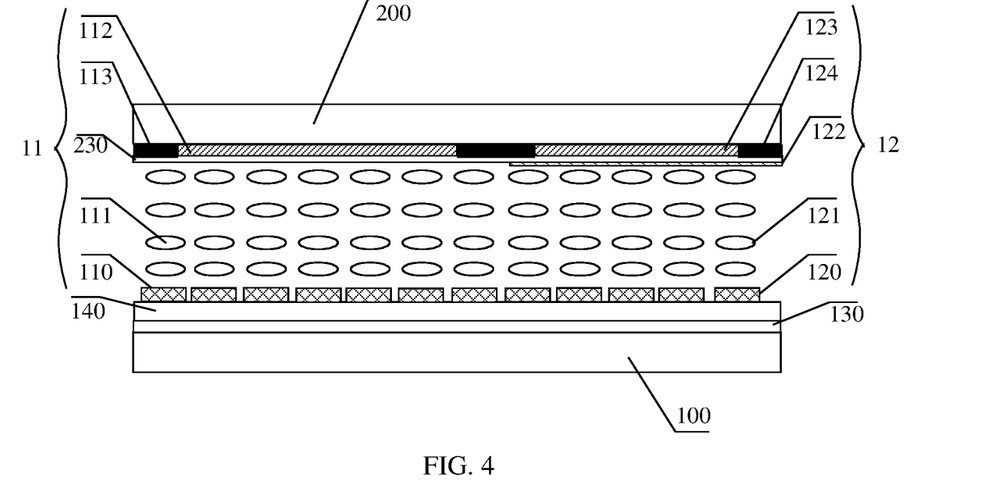
FIG. 4 is a schematic structural view of a sub-pixel region according to some embodiments of the present disclosure.

For example, as shown in FIG. 4, the color filter substrate further includes a planarization layer 230 on the side of the color filter layers 123, 112 and the black matrix layers 124, 113 facing the liquid crystal layers 111, 121, the optical film layer 122 is formed on a side of the planarization layer 230 facing the liquid crystal layers 111, 121, and the orthographic projection of the color filter layer 123 on the second substrate 200 falls into the orthographic projection of the optical film layer 122 on the second substrate 200. The refractive index of the optical film layer 122 is smaller than the refractive index of the liquid crystal layer 121, and a refractive index of the planarization layer 230 is equal to the refractive index of the liquid crystal layer 122.

Referring back to FIG. 3, a total reflection critical angle at an interface between the liquid crystal layer 121 and the optical film layer 122 is labeled as C. When an incident angle of the light is greater than the total reflection critical angle C, the total reflection occurs, so that the light cannot pass through the color filter substrate, thereby achieving anti-peeping. When the incident angle of the light (as indicated by incident angle B in FIG. 3) is less than the total reflection critical angle C, the light will pass through the color filter substrate directly.

For example, the refractive index of the liquid crystal layer 121 is equal to n1, and the refractive index of the optical film layer 122 is equal to n2. According to the principle of optical total reflection, the total reflection critical angle $C=\arcsin(n2/n1)$.

It should be noted that main transparent layers in the color filter substrate include the base substrate 200, the color filter layer 123, and the optical film layer 122. In order to obtain a display panel having the maximum transmittance, typically, refractive indices of the transparent layers should be equal to each other so as to reduce brightness loss caused by light reflections at interfaces between two transparent layers. Therefore, except for the optical film layer 122, the refractive indices of the base substrate 200, the color filter layer 123, and the liquid crystal layer 121 are equal to each other, for example, the refractive indices thereof may be equal to 1.5.

As shown in FIG. 3, when the incident angle of the light, labeled as B, is smaller than the total reflection critical angle C, the light is refracted at the interface between the liquid crystal layer 121 and the optical film layer 122, and when the refracted light reaches an interface between the optical film layer 122 and the color filter layer 123, a refraction occurs again. According to the reversibility principle of optical path, it can be seen that the light is only translated after it is refracted twice, that is, an exit angle which refers to an angle between exit light and a normal F perpendicular to the color filter substrate is not changed relative to the incident angle. In such a case, the light is emitted toward a side of the color film substrate facing away from the liquid crystal layer 121, and the exit angle of the light is equal to the incident angle thereof. As a result, when the incident angle of the light is less than the total reflection critical angle C, the light may directly pass through the color filter substrate, and the corresponding exit angle is also smaller than the total reflection critical angle C. Therefore, when an angle between a position where the user is located and the normal F perpendicular to the color filter substrate is less than the total reflection critical angle C, the contrast is normal and information displayed by the display apparatus may be normally observed, that is, the visual angle of the user is less than the total reflection critical angle C. When the angle between a position where an observer is located and the normal F perpendicular to the color filter substrate is greater than the total reflection critical angle C, the observer cannot observe the information displayed by the display apparatus, thereby achieving information protection.

The first view pixel 11 is different from the second view pixel 12 in that: the second view pixel is provided with the optical film layer 122 on the side of the liquid crystal layer facing the color filter layer, and the optical film layer 122 has a refractive index smaller than the liquid crystal layer 121; and the first view pixel is not provided with the optical film layer 122. When light is emitted from the liquid crystal layer of the first view pixel to the color filter layer, the light emitted from the first view pixel has a large exit angle since there is no low refractive index layer. When light is emitted from the liquid crystal layer of the second view pixel to the color filter layer, light having a large incident angle is subjected to a total reflection when it passes through the interface of the optical film layer 122, and thus it cannot be emitted from the color filter layer. Most of light emitted from the second view pixel is straight light, thereby achieving an effect of narrowing the visual angle. Therefore, the visual angle of the second view pixel is smaller than the visual angle of the first view pixel.

For example, the liquid crystal layer 121 has a refractive index of 1.5. In order to achieve anti-peeping in an angle range of greater than 45°, the refractive index of the optical film layer 122 may be set to 1.0605. In this case, when the angle between the position where the observer is located and the normal F perpendicular to the color filter substrate is greater than 45°, the corresponding information cannot be observed so as to achieve anti-peeping. Similarly, in order to achieve anti-peeping in an angle range of greater than 30°, a ratio of the refractive index n2 of the optical film layer 122 to the refractive index n1 of the liquid crystal layer 12 may be equal to 0.5. In order to achieve anti-peeping in an angle range of greater than 60°, the ratio of the refractive index n2 of the optical film layer 122 to the refractive index n1 of the liquid crystal layer 12 may be equal to 0.866.

Similarly, in the color filter substrate shown in FIG. 4, the optical film layer 122 is formed on the planarization layer 230, and a refractive index of the planarization layer 230 is equal to the refractive index of the liquid crystal layer 121. When the incident angle B of the light is less than the total reflection critical angle C, the light is refracted at the interface between the liquid crystal layer 121 and the optical film layer 122, and when the refracted light reaches an interface between the optical film layer 122 and the planarization layer 230, a refraction occurs again. An exit angle is not changed relative to the incident angle. Since the refractive indices of the planarization layer 230, the color filter layer 123, and the base substrate 200 are equal to each other, the light that reaches the planarization layer 230 may directly pass through the color filter layer 123 and the base substrate 200. As a result, when the incident angle of the light is less than the total reflection critical angle C, the light may directly pass through the color filter substrate, and the corresponding exit angle is also smaller than the total reflection critical angle C. Therefore, when the angle between the position where the observer is located and the normal F perpendicular to the color filter substrate is less than the total reflection critical angle C, the contrast is normal and the information displayed by the display apparatus may be normally observed, that is, the visual angle of the user is less than the total reflection critical angle C. When the angle between the position where the observer is located and the normal F perpendicular to the color filter substrate is greater than the total reflection critical angle C, the observer cannot observe the information displayed by the display apparatus, thereby achieving the purpose of information protection.

In the embodiments of the present disclosure, the optical film layer is disposed on the side of the color filter substrate facing the liquid crystal layer, and the refractive index of the optical film layer is smaller than the refractive index of the liquid crystal layer. Based on the principle of optical total reflection, a total reflection occurs at the interface between the liquid crystal layer and the optical film layer when the incident angle of the light is greater than the total reflection critical angle, so that the light cannot pass through the color filter substrate, thereby preventing information leakage effectively and improving information security. Also, by adjusting the refractive index of the optical film layer 122, anti-peeping in different angle ranges may be achieved. As the ratio of the refractive index n2 of the optical film layer 122 to the refractive index n1 of the liquid crystal layer 121 becomes small, the visual angle becomes small correspondingly. By reducing the refractive index of the optical film layer, the visual angle of the display apparatus is correspondingly reduced.

Although FIG. 3 and FIG. 4 show the liquid crystal display panel having IPS mode, it should be noted that the implementations may also be applied to the liquid crystal display panel having other modes such as the FFS mode or the TN mode.

Figure 5:
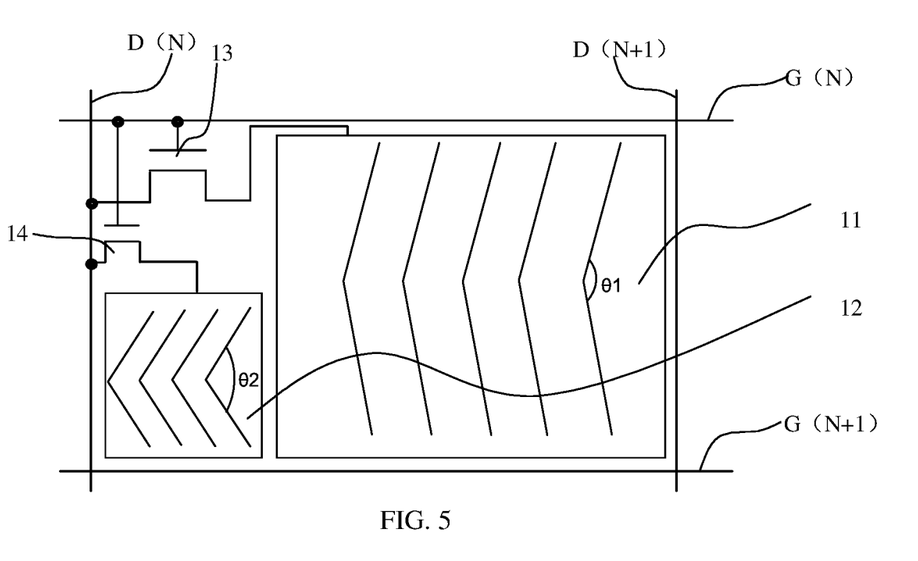
FIG. 5 is a plan view of a sub-pixel region according to some embodiments of the present disclosure.

FIG. 5 is a plan view of a sub-pixel region according to some embodiments of the present disclosure. As shown in FIG. 5, the first view pixel 11 and the second view pixel 12 each include a pixel electrode and a common electrode. A drain electrode of the thin film transistor 13 may be electrically connected to the pixel electrode of the first view pixel 11, and a drain electrode of the thin film transistor 14 may be electrically connected to the pixel electrode of the second view pixel 12.

Figure 6A:
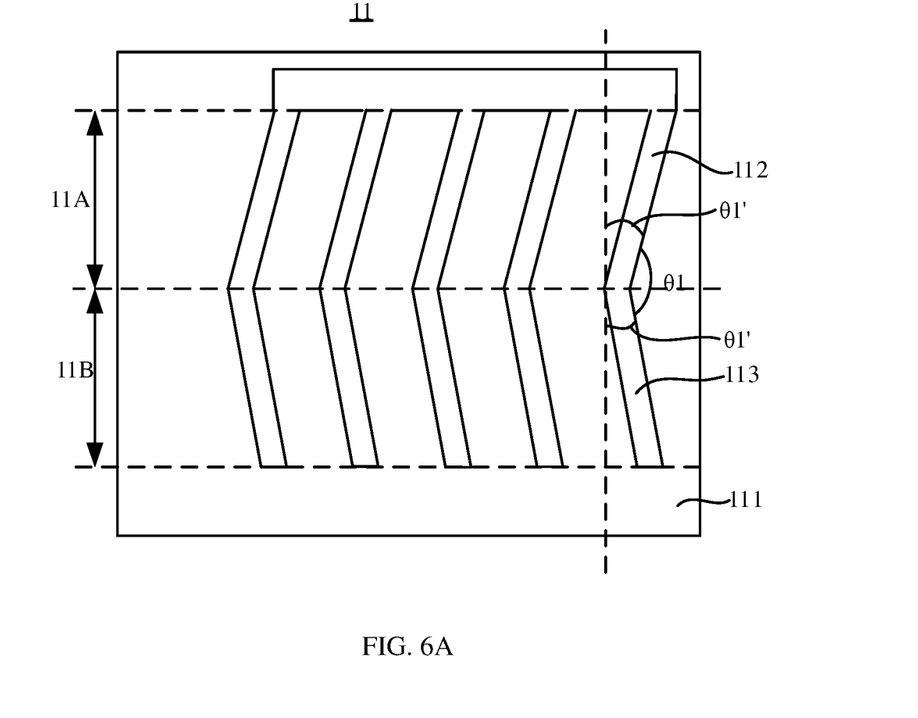
FIG. 6A is a schematic plan view showing a pixel electrode and a common electrode included in a first view pixel according to some embodiments of the present disclosure.

Referring to FIG. 6A, a plan view of the pixel electrode and the common electrode of the first view pixel 11 is illustrated. The pixel electrode of the first view pixel 11 may be a slit electrode, for example, the pixel electrode may include a plurality of first sub-electrodes 112 and a plurality of second sub-electrodes 113. The first sub-electrodes 112 are spaced apart from each other, and the second sub-electrodes 113 are spaced apart from each other. The first sub-electrodes 112 extend in a first direction. The second sub-electrodes 113 extend in a second direction, and an angle between the first direction and the second direction is θ1. The common electrode 111 of the first view pixel 11 has a plate shape. In the first view pixel 11, the pixel electrode may be located above or below the common electrode 111, and an insulating layer is provided between the pixel electrode and the common electrode. The first sub-electrodes 112 and the second sub-electrodes 113 respectively extend in two intersecting directions, so that the first view pixel 11 is divided into two domain regions in the up-down direction, that is, an upper domain region 11A and a lower domain region 11B as shown in FIG. 6A.

Figure 6B:
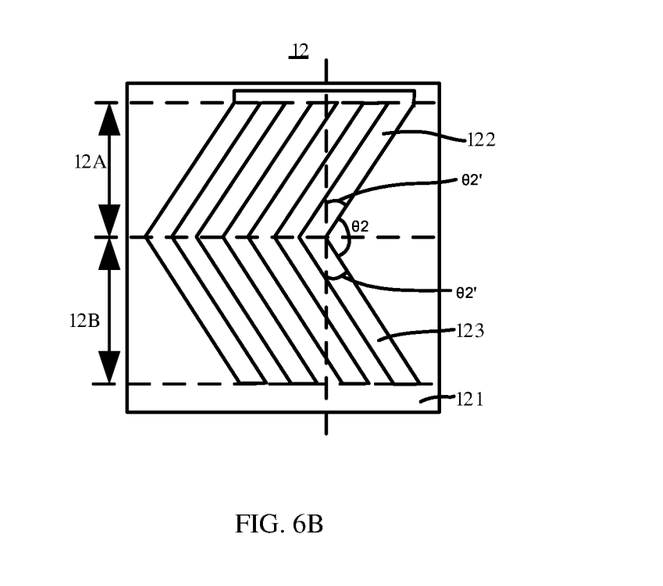
FIG. 6B is a schematic plan view showing a pixel electrode and a common electrode included in a second view pixel according to some embodiments of the present disclosure.

Referring to FIG. 6B, a plan view of the pixel electrode and the common electrode of the second view pixel 12 is shown. The pixel electrode of the second view pixel 12 may be a slit electrode, for example, the pixel electrode may include a plurality of third sub-electrodes 122 and a plurality of fourth sub-electrodes 123. The third sub-electrodes 122 are spaced apart from each other, and the fourth sub-electrodes 123 are spaced apart from each other. The third sub-electrodes 122 extend in a third direction. The fourth sub-electrodes 123 extend in a fourth direction, and an angle between the third direction and the fourth direction is θ2. The common electrode 121 of the second view pixel 12 has a plate shape. In the second view pixel 12, the pixel electrode may be located above or below the common electrode 121, and an insulating layer is provided between the pixel electrode and the common electrode. The third sub-electrodes 122 and the fourth sub-electrodes 123 respectively extend in two intersecting directions, so that the second view pixel 12 is divided into two domain regions in the up-down direction, that is, an upper domain region 12A and a lower domain region 12B as shown in FIG. 6B.

In some embodiments of the present disclosure, the angle $\theta1$ is not equal to the angle $\theta2$.

For example, the angle $\theta1$ may be greater than the angle $\theta2$. As an example, referring to FIG. 6A, an angle $\theta1'$ of the first sub-electrode 112 with regard to the vertical direction (i.e., a direction parallel to the data line) may be about 5°, and an angle of the second sub-electrode 113 with regard to the vertical direction (i.e., the direction parallel to the data line) may be equal to $\theta1'$, that is, also about 5°, such that the angle $\theta1$ is equal to about 170°. Referring to FIG. 6B, an angle $\theta2'$ of the third sub-electrode 122 with regard to the vertical direction (i.e., the direction parallel to the data line) may be about 7°, an angle of the fourth sub-electrode 123 with regard to the vertical direction (i.e., the direction parallel to the data line) may be equal to $\theta2'$, that is, also about 7°, such that the angle $\theta2$ is equal to about 166°. The inventors have found through simulation experiments that there is about 2% change in light transmittance between the first view pixel 11 and the second view pixel 12, specifically, the light transmittance of the first view pixel 11 is about 2% higher than that of the second view pixel. Such a change in light transmittance may cause a change in the visual angle between the two view pixels. Further, an in-plane electric field generated in the first view pixel 11 is different from that generated in the second view pixel 12, and correspondingly, liquid crystal molecules in the liquid crystal layer of the first view pixel 11 are deflected under an effect of the in-plane electric field by a first deflecting angle, and liquid crystal molecules in the liquid crystal layer of the second view pixel 12 are deflected under an effect of the in-plane electric field by a second deflecting angle, the first deflecting angle is different from the second deflecting angle, resulting in different visual angles of the two view pixels. In the above example, the visual angle of the first view pixel 11 is greater than the visual angle of the second view pixel 12. The inventors have further found that the difference in the light transmittance of the two view pixels and the difference in the visual angles of the two view pixels may become greater as the difference between the angle $\theta1$ and the angle $\theta2$ is further increased.

In some embodiments of the present disclosure, the angle $\theta1$ is designed to be different from the angle $\theta2$ such that the light transmittances and the visual angles of the two view pixels are different. Specifically, the angle $\theta1$ is designed to be greater than the angle $\theta2$ such that the light transmittance and the visual angle of the second view pixel are smaller than the light transmittance and the visual angle of the first view pixel, respectively. In this way, when both the first view pixel and the second view pixel emit light, the visual angle of the display apparatus is large, thereby achieving the normal display effect. When the first view pixel does not emit light and the second view pixel emits light, that is, only the second view pixel emits light, the visual angle of the display apparatus is small, thereby achieving the anti-peeping effect.

It should be noted that the implementations may be applied to a liquid crystal display panel having the IPS mode or FFS mode.

Figure 7:
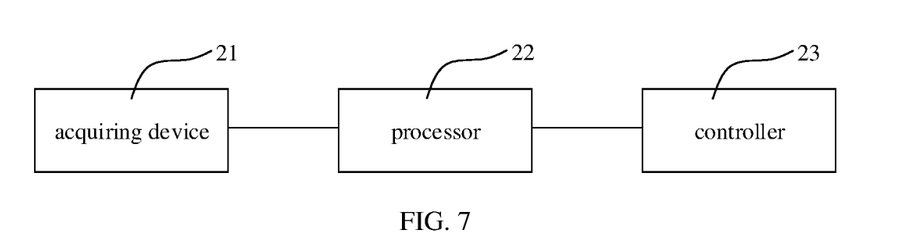
FIG. 7 is a schematic structural view of a view control device according to some embodiments of the present disclosure.

Optionally, FIG. 7 is a schematic structural view of a view control device according to some embodiments of the present disclosure. As shown in FIG. 7, the view control device according to the embodiments of the present disclosure may include: an acquiring device 21, a processor 22, and a controller 23.

Specifically, the acquiring device 21 is configured to acquire image information on the user side of the display panel. The processor 22 is configured to identify the image information so as to obtain the number of users, and configured to send a first control signal to the controller 23 in response to that the number of users is equal to 1, and to send a second control signal to the controller 23 in response to that the number of users is greater than 1. The controller 23 is configured to control a driving voltage of the scan line of the display panel to be a first voltage according to the first control signal, so that the display panel displays the first view mode according to the first voltage, and configured to control the driving voltage of the scan line of the display panel to be a second voltage according to the second control signal, so that the display panel displays the second view mode according to the second voltage.

For example, the first voltage is greater than the second voltage. The first voltage may be equal to the threshold voltage of the first switch unit 13, and the second voltage may be equal to the threshold voltage of the second switch unit 14.

Optionally, the acquiring device 21 is disposed at any position on the user side of the display apparatus, which is not limited in the embodiments. Specifically, the acquiring device 21 includes one or more cameras which may acquire the image information on the user side of the display apparatus at a fixed frequency.

Optionally, the processor 22 may identify human faces or human eyes according to the image information, and then count the number of human faces or the number of human eyes in the image information. When the number of human faces in the image information is equal to 1 or the number of human eyes is equal to 2, that is, when there is no other person beside the user, the first control signal is sent to the controller, wherein the first control signal may be empty, that is, the processor does not send any signal. When the number of human faces in the image information exceeds 1 or the number of human eyes is greater than 2, that is, when there may be another person(s) beside the user, the second control signal is sent to the controller.

Optionally, the processor 22 may be a component such as a central processing unit (CPU), a microprocessor, or the like, which is not limited in the embodiments. Optionally, the first control signal or the second control signal may be represented by a code or a pulse signal.

Optionally, the processor 22 may be disposed at any position of the display apparatus, which is not limited in the embodiments of the present disclosure.

Optionally, the controller 23 controls the driving voltage of the scan line of the display panel to be the first voltage when it receives the first control signal, so that the display panel displays the first view mode. In this case, both the first view pixel and the second view pixel emit light. The controller 23 controls the driving voltage of the scan line of the display panel to be the second voltage when it receives the second control signal, so that the display panel displays the second view mode. In this case, the first view pixel does not emit light and the second view pixel emits light. Since the first view pixel does not emit light, the visual angle of the display panel is small, and the overall brightness of a screen is significantly reduced, so that it is difficult for another person(s) beside the user to observe contents on the screen at a large angle, thereby realizing the anti-peeping.

Optionally, the controller 23 may be disposed at any position of the display apparatus, which is not limited in the embodiments of the present disclosure.

Optionally, the controller 23 is further configured to supply an electric power to the acquiring device 21 and the processor 22, and further configured to receive control instructions from the user, so that the controller 23 may start to supply or stop supplying the electric power to the acquiring device and the processor according to the control instructions. In this way, the display apparatus may be applied more flexibly.

In the display apparatus according to the embodiments of the present disclosure, the anti-peeping function may be disabled by pressing a physical button when the user does not mind peeping or considers that it is unnecessary to switch modes. In this case, the controller may no longer supply electric power to the acquiring device and the processor, and the processor may no longer send the control signals to the controller.

Optionally, the display apparatus according to the embodiments of the present disclosure may further include a backlight module. The controller may be further configured to adjust a brightness of the backlight module according to the first control signal or the second control signal, in order to reduce an influence on the user while performing the anti-peeping function.

Specifically, the controller may increase the brightness of the backlight module according to the first control signal, and reduce the brightness of the backlight module according to the second control signal.

Optionally, in the embodiments of the present disclosure, the controller may be further configured to generate alarm information according to the second control signal so as to alert the user. In this way, functions of the display apparatus may be enriched.

Optionally, the alarm information may alert the user in the form of vibration, short message or flashing. Optionally, the user may also enable or disable the anti-peeping function and set an anti-peeping reminding interface through a software.

Figure 8:
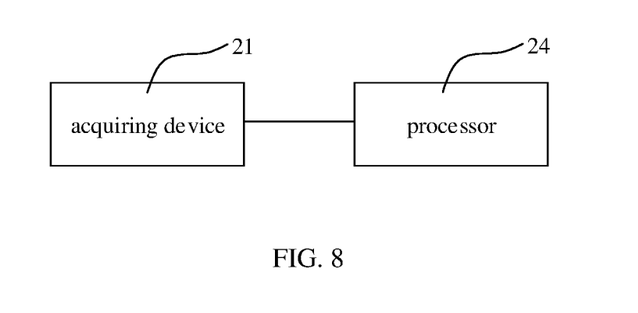
FIG. 8 is a schematic structural view of a view control device according to some embodiments of the present disclosure.

Optionally, FIG. 8 is a schematic structural view of a view control device according to some embodiments of the present disclosure. As shown in FIG. 8, the view control device according to the embodiments of the present disclosure may include: an acquiring device 21 and a processor 24.

Specifically, the acquiring device 21 is configured to acquire image information on the user side of the display panel. Optionally, the acquiring device 21 may include one or more cameras which may acquire the image information on the user side of the display panel at a fixed frequency. The acquiring device may be implemented specifically with reference to the acquiring device described above.

The processor 24 is configured to: identify the image information so as to obtain the number of users; in response to that the number of users is equal to 1, control a driving voltage of the scan line of the display panel to be a first voltage, so that the display panel displays the first view mode according to the first voltage; and in response to that the number of users is greater than 1, control the driving voltage of the scan line of the display panel to be the second voltage, so that the display panel displays the second view mode according to the second voltage. For example, the first voltage is greater than the second voltage. The first voltage may be equal to the threshold voltage of the first switch unit 13, and the second voltage may be equal to the threshold voltage of the second switch unit 14.

Optionally, the processor 24 may be a processor of the display apparatus, that is, the processor of the view control device is integrated with the processor of the display apparatus, and functions of the view control device including data processing and controlling are integrated into an operating system or a control system of the display apparatus. For example, the display apparatus may be a computer, and the processor 24 may be a central processing unit (CPU) of the computer, and the functions of the view control device including data processing and controlling may be integrated into an operating system of the computer or a software installed on the computer. For another example, the display apparatus may be a smartphone, and the processor 24 may be a central processing unit (CPU) of the smartphone, and the functions of the view control device including data processing and controlling may be integrated into an operating system or an application of the smartphone.

The processor 24 may be a component such as a central processing unit (CPU), a microprocessor, or the like, which is not limited in the embodiments.

Figure 9:
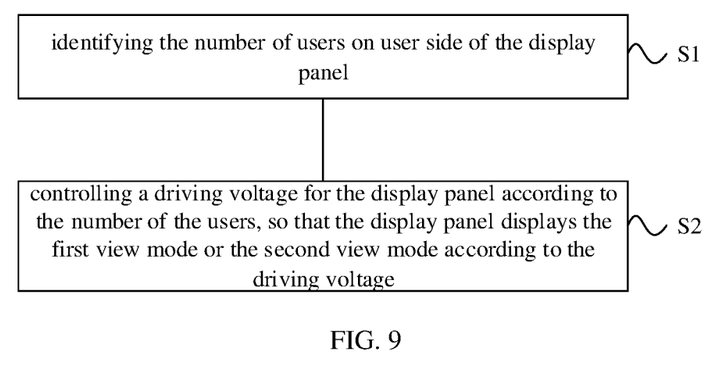
FIG. 9 is a flowchart of a control method of a display apparatus according to some embodiments of the present disclosure.

The embodiments of the present disclosure provide a control method of a display apparatus, and FIG. 9 is a flowchart of the control method of the display apparatus according to some embodiments of the present disclosure. As shown in FIG. 9, the control method of the display apparatus according to the embodiments of the present disclosure may specifically include the following steps:

step S1: identifying the number of users on the user side of the display panel; and step S2: controlling a driving voltage for the display panel according to the number of the users, so that the display panel displays the first view mode or the second view mode according to the driving voltage.

Specifically, the step S1 includes: acquiring image information on the user side of the display panel; and identifying the image information to obtain the number of users.

Specifically, the step S2 includes: sending a first control signal in response to that the number of users is equal to 1, and controlling a driving voltage of the scan line of the display panel to be a first voltage according to the first control signal, so that the display panel displays the first view mode according to the first voltage; and sending a second control signal in response to that the number of users is greater than 1, and controlling the driving voltage of the scan line of the display panel to be a second voltage according to the second control signal, so that the display panel displays the second view mode according to the second voltage.

The control method of the display apparatus according to the embodiments of the present disclosure is capable of switching the view modes of the display panel according to surrounding environments, thereby realizing intelligent anti-peeping and meeting user's needs.

Those skilled in the art will appreciate that all or some of steps of the methods disclosed above, and all or some of functional modules or units of the systems, devices or apparatus disclosed above may be implemented as software, firmware, hardware, and any suitable combinations thereof. In hardware implementations, the functional modules or units disclosed above may be divided in a manner which does not necessarily correspond to physical components. For example, one physical component may have multiple functions, or one function or one step may be performed by a cooperation of several physical components. Some or all of the components may be implemented as software executed by a processor such as a digital signal processor or microprocessor, or implemented as hardware, or implemented as an integrated circuit such as an application specific integrated circuit. Such software may be distributed on a computer readable medium which may include computer storage medium (or non-transitory medium) and communication medium (or transitory medium). As well known to those skilled in the art, the term "computer storage medium" includes volatile, nonvolatile, removable and non-removable media implemented in any method or technology for storing information, such as computer readable instructions, data structures, program modules or other data. The computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage device, or any other medium which may store desired information and can be accessed by the computer. Moreover, it is well known to those skilled in the art that "communication medium" typically includes computer readable instructions, data structures, program modules, or other data included in a modulated data signal, such as a carrier wave or other transport mechanism, and may include any information delivery media.

The drawings of the embodiments of the present disclosure may manly relate to structures involved in the embodiments of the present disclosure, and other structures may refer to typical designs.

Features in the embodiments of the present disclosure may be combined with each other to obtain new embodiments without conflict.

Though the embodiments of the present disclosure have been described as above, the above descriptions are merely used to facilitate understanding the present disclosure, and they are not intended to limit the present disclosure. Any modification and variation in forms and details of the embodiments may be made by those skilled in the art without departing from the spirit and scope of the present disclosure. The scope of the present disclosure shall be defined by the appended claims and equivalents thereof.

What is claimed is:

1. A display apparatus comprising:
    a display panel comprising a plurality of rows of scan lines and a plurality of columns of data lines, the plurality of rows of scan lines and the plurality of columns of data lines defining a plurality of sub-pixel regions, a first view pixel and a second view pixel being provided in each of the sub-pixel regions; and
    a view control device connected with the display panel, the view control device configured to: identify a number of users on a user side of the display panel; and control a driving voltage of the scan lines according to the number of the users, so that the display panel controls the first view pixel and the second view pixel according to the driving voltage so as to display a first view mode or a second view mode,
    wherein a visual angle in the first view mode is greater than a visual angle in the second view mode;
    wherein a first switch unit and a second switch unit are further provided in each of the sub-pixel regions;
    wherein the first view pixel is respectively connected with one of the scan lines and one of the data lines through the first switch unit, the second view pixel is respectively connected with one of the scan lines and one of the data lines through the second switch unit, and the first switch unit and the second switch unit in a same one of the sub-pixel regions are connected with a same one of the scan lines and a same one of the data lines;
    wherein the first switch unit and the second switch unit are both thin film transistors; and
    wherein a threshold voltage of the first switch unit is greater than a threshold voltage of the second switch unit, so that the display panel controls the first view pixel and the second view pixel according to a relationship between the driving voltage and the threshold voltage of the first switch unit and a relationship between the driving voltage and the threshold voltage of the second switch unit.

2. The display apparatus of claim 1, wherein the view control device is configured to control the driving voltage of the scan lines according to the number of the users, so that the display panel controls both the first view pixel and the second view pixel to emit light so as to display the first view mode.

3. The display apparatus of claim 1, wherein the view control device is configured to control the driving voltage of the scan lines according to the number of the users, so that the display panel controls the first view pixel not to emit light and the second view pixel to emit light so as to display the second view mode.

4. The display apparatus of claim 2, wherein the view control device is configured to control the driving voltage of the scan lines according to the number of the users, so that the display panel controls the first view pixel not to emit light and the second view pixel to emit light so as to display the second view mode.

5. The display apparatus of claim 1, wherein the second view pixel comprises:
    a liquid crystal layer;
    a color filter layer; and
    an optical film layer on a side of the color filter layer facing the liquid crystal layer, and
    wherein a refractive index of the optical film layer is smaller than a refractive index of the liquid crystal layer.

6. The display apparatus of claim 1, wherein the first view pixel and the second view pixel each comprise a pixel electrode; and
    wherein the pixel electrode of the first view pixel comprises a first sub-electrode extending in a first direction and a second sub-electrode extending in a second direction, and the first direction intersects with the second direction to form a first angle; the pixel electrode of the second view pixel comprises a third sub-electrode extending in a third direction and a fourth sub-electrode extending in a fourth direction, and the third direction intersects with the fourth direction to form a second angle, the first angle being not equal to the second angle.

7. The display apparatus of claim 6, wherein the first angle is greater than the second angle.

8. The display apparatus of claim 1, wherein an area of the first view pixel is greater than an area of the second view pixel.

9. The display apparatus of claim 1, wherein the view control device comprises:
    an acquiring device configured to acquire image information on a user side of the display panel;
    a processor configured to identify the image information so as to obtain the number of users; and
    a controller connected with the processor,
    wherein the processor is further configured to: send a first control signal to the controller in response to that the number of users is equal to 1; and send a second control signal to the controller in response to that the number of users is greater than 1; and
    wherein the controller is configured to: control the driving voltage of the scan lines to be a first voltage according to the first control signal, so that the display panel displays the first view mode according to the first voltage; and control the driving voltage of the scan lines to be a second voltage according to the second control signal, so that the display panel displays the second view mode according to the second voltage.

10. The display apparatus of claim 1, wherein the view control device comprises:
an acquiring device configured to acquire image information on a user side of the display panel; and
a processor configured to:
identify the image information so as to obtain the number of users;
in response to that the number of users is equal to 1, control the driving voltage of the scan lines to be a first voltage, so that the display panel displays the first view mode according to the first voltage; and
in response to that the number of users is greater than 1, control the driving voltage of the scan lines to be a second voltage, so that the display panel displays the second view mode according to the second voltage.

11. The display apparatus of claim 9, wherein the first voltage is greater than the second voltage.

12. The display apparatus of claim 10, wherein the first voltage is greater than the second voltage.

13. The display apparatus of claim 11, wherein the first voltage is equal to the threshold voltage of the first switch unit, and the second voltage is equal to the threshold voltage of the second switch unit.

14. The display apparatus of claim 9, wherein the controller is further configured to receive control instructions from the users so as to start to supply or stop supplying an electric power to the acquiring device and the processor according to the control instructions.

15. The display apparatus of claim 9, wherein the display apparatus further comprises a backlight module; and
wherein the controller is further configured to adjust a brightness of the backlight module according to the first control signal or the second control signal.

16. The display apparatus of claim 9, wherein the controller is further configured to: according to the second control signal, generate alert information so as to alert the users.

17. A control method for controlling a display apparatus, the display apparatus comprising a display panel and a view control device, the display panel comprising a plurality of rows of scan lines and a plurality of columns of data lines, the plurality of rows of scan lines and the plurality of columns of data lines defining a plurality of sub-pixel regions, a first view pixel and a second view pixel being provided in each of the sub-pixel regions, wherein the control method comprises:
identifying a number of users on a user side of the display panel by using the view control device; and
controlling a driving voltage of the scan lines according to the number of the users, so that the display panel controls the first view pixel and the second view pixel according to the driving voltage so as to display a first view mode or a second view mode,
wherein a visual angle in the first view mode is greater than a visual angle in the second view mode;
wherein a first switch unit and a second switch unit are further provided in each of the sub-pixel regions;
wherein the first view pixel is respectively connected with one of the scan lines and one of the data lines through the first switch unit, the second view pixel is respectively connected with one of the scan lines and one of the data lines through the second switch unit, and the first switch unit and the second switch unit in a same one of the sub-pixel regions are connected with a same one of the scan lines and a same one of the data lines;
wherein the first switch unit and the second switch unit are both thin film transistors; and
wherein a threshold voltage of the first switch unit is greater than a threshold voltage of the second switch unit, so that the display panel controls the first view pixel and the second view pixel according to a relationship between the driving voltage and the threshold voltage of the first switch unit and a relationship between the driving voltage and the threshold voltage of the second switch unit.

* * * * *